(12) United States Patent
Hine et al.

(10) Patent No.: US 8,668,534 B2
(45) Date of Patent: Mar. 11, 2014

(54) WAVE POWER

(75) Inventors: Roger G. Hine, Menlo Park, CA (US);
Derek L. Hine, Portola Valley, CA (US);
Kurt A. F. Kiesow, San Jose, CA (US);
William Stutz, San Jose, CA (US);
Graham Hine, Sunnyvale, CA (US)

(73) Assignee: Liquid Robotics, Inc, Sunnyvale, CA (US)

( * ) Notice: Subject to any disclaimer, the term of this patent is extended or adjusted under 35 U.S.C. 154(b) by 355 days.

(21) Appl. No.: 12/449,753

(22) PCT Filed: Feb. 29, 2008

(86) PCT No.: PCT/US2008/002743
§ 371 (c)(1),
(2), (4) Date: Mar. 9, 2010

(87) PCT Pub. No.: WO2008/109002
PCT Pub. Date: Sep. 12, 2008

(65) Prior Publication Data
US 2010/0190394 A1 Jul. 29, 2010

Related U.S. Application Data

(60) Provisional application No. 60/904,647, filed on Mar. 2, 2007.

(51) Int. Cl.
*B63B 45/00* (2006.01)
(52) U.S. Cl.
USPC .................................................. 440/9
(58) Field of Classification Search
USPC ................... 114/89–91, 243; 440/9
See application file for complete search history.

(56) References Cited

U.S. PATENT DOCUMENTS

| | | | |
|---|---|---|---|
| 986,627 | A | 3/1911 | Fischer |
| 1,067,113 | A | 7/1913 | Heyen |

(Continued)

FOREIGN PATENT DOCUMENTS

| | | |
|---|---|---|
| BE | 570555 | 9/1958 |
| BE | 570555 A | 9/1958 |

(Continued)

OTHER PUBLICATIONS

Communication from Japanese patent office, Apr. 2011.

(Continued)

*Primary Examiner* — Edwin Swinehart

(57) ABSTRACT

A float (1) suitable for use as a buoy or as a component for a wave-powered vehicle. The float (1) includes an upper member (12) whose height can be changed and/or which remained substantially vertical even when the float is in wave-bearing water. A low drag cable (2) suitable for use as a tether in a wave-powered vehicle has a streamlined cross-section and includes a tensile member (21) near the front of the cross-section, at least one non-load-bearing member (22) behind the tensile member, and a polymeric jacket (23). Wave-powered vehicles having a float (1), a submerged swimmer (3) and a tether (2) connecting the float and the swimmer, include a means for determining whether the tether is twisted; or a means for untwisting the tether; or a pressure-sensitive connection (71, 72, 73) which can disconnect the tether when the vehicle is dragged downwards by entanglement with a whale; or a 2-axis universal joint securing the tether to the float or to the swimmer; or elastic elements which absorb snap loads created by the tether; or two or more of these.

17 Claims, 3 Drawing Sheets

(56) References Cited

U.S. PATENT DOCUMENTS

| | | | |
|---|---|---|---|
| 1,315,267 A | 9/1919 | White | |
| 1,316,267 A | 9/1919 | White | |
| 2,170,914 A * | 8/1939 | Rummler | 114/39.31 |
| 2,520,804 A | 8/1950 | Hollar | |
| 2,668,512 A | 2/1954 | Klas | |
| 3,132,322 A | 5/1964 | Maes | |
| 3,297,814 A | 1/1967 | McLean | |
| 3,312,186 A | 4/1967 | Litsheim | |
| 3,352,274 A | 11/1967 | Clakins | |
| 3,443,020 A * | 5/1969 | Loshigian | 174/101.5 |
| 3,453,981 A | 7/1969 | Gause | |
| 3,508,516 A | 4/1970 | Root | |
| 3,613,627 A * | 10/1971 | Kennedy | 114/243 |
| 3,760,441 A | 9/1973 | Handelman | |
| 3,828,380 A * | 8/1974 | Lebovits et al. | 441/21 |
| 3,845,733 A | 11/1974 | Jackman | |
| 3,859,949 A | 1/1975 | Toussaint | |
| 3,860,900 A | 1/1975 | Scudder | |
| 3,872,819 A | 3/1975 | Pickens | |
| 3,889,045 A * | 6/1975 | Logsdon | 174/70 R |
| 3,928,967 A | 12/1975 | Salter | |
| 3,962,982 A | 6/1976 | Marchay | |
| 3,978,813 A | 9/1976 | Pickens | |
| 4,134,023 A | 1/1979 | Salter | |
| 4,224,707 A | 9/1980 | Mariani | |
| 4,332,571 A | 6/1982 | Jakobsen | |
| 4,371,347 A | 2/1983 | Jakobsen | |
| 4,383,725 A | 5/1983 | Bogese | |
| 4,389,843 A | 6/1983 | Lamberti | |
| 4,598,547 A | 7/1986 | Danibel | |
| 4,610,212 A * | 9/1986 | Petrovich | 114/39.26 |
| 4,638,588 A | 1/1987 | Abadie | |
| 4,673,363 A | 6/1987 | Hudson | |
| 4,684,350 A | 8/1987 | DeLima | |
| 4,684,359 A | 8/1987 | Herrington | |
| 4,726,314 A | 2/1988 | Ayers | |
| 4,763,126 A | 8/1988 | Jawetz | |
| 4,842,560 A | 6/1989 | Lee | |
| 4,896,620 A | 1/1990 | Jones | |
| 4,968,273 A | 11/1990 | Monot | |
| 4,981,453 A | 1/1991 | Krishan | |
| 5,050,519 A | 9/1991 | Senften | |
| 5,084,630 A | 1/1992 | Azimi | |
| 5,577,942 A | 11/1996 | Juselis | |
| 5,678,504 A * | 10/1997 | Toplosky et al. | 114/243 |
| 5,690,014 A | 11/1997 | Larkin | |
| 5,902,163 A | 5/1999 | Barruzzi | |
| 6,099,368 A | 8/2000 | Gorshkov | |
| 6,194,815 B1 | 2/2001 | Carroll | |
| 6,260,501 B1 | 7/2001 | Agnew | |
| 6,285,807 B1 * | 9/2001 | Walt et al. | 385/12 |
| 6,408,792 B1 | 6/2002 | Markels, Jr. | |
| 6,561,856 B1 | 5/2003 | Gorshkov | |
| 6,814,633 B1 | 11/2004 | Huang | |
| 6,908,229 B2 | 6/2005 | Landrieve et al. | |
| 6,980,228 B1 | 12/2005 | Harper | |
| 7,350,475 B2 | 4/2008 | Borgwarth et al. | |
| 7,371,136 B2 | 5/2008 | Hine | |
| D578,463 S | 10/2008 | Tureaud et al. | |
| 7,641,524 B2 * | 1/2010 | Hine et al. | 440/9 |
| 7,955,148 B2 | 6/2011 | Corradini | |
| 8,043,133 B2 | 10/2011 | Hine | |
| 8,205,570 B1 | 6/2012 | Tureaud et al. | |
| 2003/0009286 A1 | 1/2003 | Shibusawa et al. | |
| 2003/0174206 A1 | 9/2003 | Moroz | |
| 2003/0220027 A1 | 11/2003 | Gorshkov | |
| 2004/0102107 A1 | 5/2004 | Gorshkov | |
| 2004/0217597 A1 | 11/2004 | Carroll et al. | |
| 2006/0213167 A1 | 9/2006 | Koselka | |
| 2007/0051292 A1 | 3/2007 | Kilbourn et al. | |
| 2007/0173141 A1 | 7/2007 | Hine et al. | |
| 2008/0188150 A1 | 8/2008 | Hine et al. | |
| 2008/0294309 A1 | 11/2008 | Kaprielian | |
| 2008/0299843 A1 | 12/2008 | Hine et al. | |
| 2009/0107388 A1 | 4/2009 | Crowell et al. | |
| 2009/0193715 A1 | 8/2009 | Wilcox | |
| 2009/0311925 A1 | 12/2009 | Hine et al. | |
| 2010/0268390 A1 | 10/2010 | Anderson | |
| 2012/0029696 A1 | 2/2012 | Ota | |
| 2012/0029718 A1 | 2/2012 | Davis | |
| 2012/0069702 A1 | 3/2012 | Muyzert et al. | |
| 2012/0094556 A1 | 4/2012 | Hine et al. | |
| 2012/0295499 A1 | 11/2012 | Hine | |

FOREIGN PATENT DOCUMENTS

| | | |
|---|---|---|
| CN | 1280936 A | 1/2001 |
| CN | 268-9229 | 3/2005 |
| CN | 1715136 A | 1/2006 |
| DE | 10141805 A1 | 5/2002 |
| DE | 10300599 A1 | 7/2004 |
| DE | 102007053037 A1 | 5/2009 |
| EP | 1369013 A1 | 12/2003 |
| FR | 1159028 A | 6/1958 |
| FR | 2669886 | 6/1992 |
| GB | 2461792 A | 1/2010 |
| JP | S 55-51697 | 4/1980 |
| JP | S 55-152698 | 11/1980 |
| JP | S 61-057488 | 3/1986 |
| JP | S 64-50199 | 3/1993 |
| JP | S 63-149289 | 6/1998 |
| TW | 221588 | 3/1994 |
| TW | 547434 | 8/2003 |
| WO | WO 87/04401 | 7/1987 |
| WO | WO 94/10029 | 11/1994 |
| WO | WO 98/39205 | 9/1998 |
| WO | 01/42992 A1 | 6/2001 |
| WO | 2007/087197 A2 | 8/2007 |
| WO | 2008/109002 A2 | 9/2008 |
| WO | 2013/077931 A2 | 5/2013 |

OTHER PUBLICATIONS

Olson, Robert A., "Communications Architecture of the Liquid Robotics Wave Glider", presented at Navigation Guidance and Control of Underwater Vehicles Conference, University of Porto, Porto, Portugal, Apr. 2012, 5 pages.

Article by Luc Rainville entitled Wirewalker: An Autonomous Wavepowered Vertical Profiler, Aug. 19, 2001.

International Search Report and Written Opinion for PCT/US 2008/002743.

Communication from Japanese patent office on Oct. 18, 2011 on Japanese application 2008-551327.

Communication from Chinese Patent Office on Aug. 24, 2011 on Cn200880006903.

Summary of communication from Chinese patent office on Aug. 24, 2011.

Darpa; "Persistent Ocean Surveillance, Station Keeping Buoys, Program Overview", Aug. 31, 2004 (19 pages).

Advanced Technology Office poster, 1 page, believed to have been published Oct. 5, 2005.

Department of the Navy, "ONR/MTS Buoy Workshop 2006, Persistent Unmanned Autonomous Buoy" (21 pages), believed to have been published Mar. 13, 2006.

Austin Phelps; "Wave-Powered Motor Propels Model Boat", Popular Mechanics, Aug. 1949, pp. 182-183.

Extended European Search Report and Opinion for European application No. 08726305.

Ageev. M., "Application of solar and wave energies for long-range autonomous underwater vehicles", Advanced Robotics, 2002, p. 43-55, vol. 16, No. 1.

Advanced Technology Office, "Persistent Ocean Surveillance Station-Keeping", DARPA; EXIF metadata shows image created Oct. 5, 2005, 1 page.

Anderson, B. and Padovani, B., "Towards a Comprehensive Regional Acoustic Study for Marine Mammal Distribution and Activity Regulation", A Liquid Robotics White Paper, Jan. 2012.

Clement et al., Wave energy in Europe: Current status and perspectives, Renewable and Sustainable Energy Reviews, 2002, p. 431, vol. 6, No. 5.

(56) References Cited

OTHER PUBLICATIONS

Communication from Japanese Patent Office on Oct. 18, 2011 on Japanese Application No. 2008-551327. [English translation].
International Search Report and Written Opinion for PCT/US2012/029696, mailed Apr. 4, 2013, 21 pages.
International Search Report and Written Opinion for PCT/US2012/029718, mailed Dec. 21, 2012, 20 pages.
International Search Report and Written Opinion for PCT/US2012/029703, mailed Oct. 17, 2012, 14 pages.
International Search Report and Written Opinion for PCT/US2012/044729, mailed Oct. 17, 2012, 11 pages.
Joanne Masters, "Liquid Robotics Ocean Robots Embark on World Record Journey Across Pacific Ocean to Foster New Scientific Discoveries", Liquid Robotics, press release Nov. 17, 2011, 2 pages, San Francisco, CA.
Jones and Young., "Engineering a large sustainable world fishery," Environmental Conservation, 1997, p. 99-104, vol. 24.
Latt, Khine. "Persistent Ocean Surveillance—Station Keeping Buoys, Program Overview", DARPA, Aug. 31, 2004, 19 pages.
Lenton and Vaughan., "The radiative forcing potential of different climate geoengineering options", Atmos. Cem. Phys. Discuss., 2009, p. 2559-2608, vol. 9.
Martin, J.H and Fitzwater, S.E., "Iron Deficiency Limits Phytoplankton Growth in the north-east Pacific Subarctic", Nature, 1988, vol. 331, p. 341-343.
Martin., "Glacial-Integral CO2 Change: The Iron Hypothesis", Paleoceanography, 1990, p. 1-13, vol. 5, No. 1.
Olson, Robert A., "Communications Architecture of the Liquid Robotics Wave Glider".
Shaw, Albert. "The American Monthly Review of Reviews—An International Magazine", vol. 19, Jan.-Jun. 1899, 2 pages.
Solomon, S. et al., "Irreversible climate change due to carbon dioxide emissions", Proc. Natl. Acad. Sci. USA, 2009, vol. 106, No. 6, p. 1704-1709.
Sparks, David. "Persistent UnManned Autonomous Buoy (PUMA)", ONR/MTS Buoy Workshop 2006, SeaLandAire Technologies, Inc., Mar. 15, 2006, Texas A&M University, College Station, 26 pages.
Wilcox, S. et al. "An autonomous mobile platform for underway surface carbon measurements in open-ocean and coastal waters", In Proceedings MTS/IEEE Oceans 2009, Biloxi, MS, Oct. 2009.
Liquid Robotics (Brochure), 201, 48 pages, retrieved from [http://liquid.com/resources/press-kit.html] on Apr. 30, 2013.
International Search Report and Written Opinion of International Application No. PCT/US2012/055797, mailed May 28, 2013, 11 pages.

* cited by examiner

WAVE POWER

CROSS-REFERENCE TO RELATED APPLICATIONS

This application is an application under 35 USC 371 based on PCT/US 2008/002743, filed Feb. 29, 2008, and claims priority from U.S. provisional patent application No. 60/904,647, filed Mar. 2, 2007, by Roger Hine et al. This application is also related to U.S. Provisional Application No. 60/760,893, filed 20 Jan. 2006, U.S. application Ser. No. 11/436,447, filed 18 May, 2006, now U.S. Pat. No. 7,371,136, U.S. application Ser. No. 12/082,457, filed 11 Apr. 2008, a divisional of U.S. application Ser. No. 11/436,447, U.S. application Ser. No. 12/082,513, filed 11 Apr. 2008, a divisional of U.S. application Ser. No. 11/436,447, U.S. Provisional Application No. 60/841,834 filed 1 Sep. 2006, and International Patent Application No. PCT/US 07/01139, filed 18 Jan. 2007, published 2 Aug. 2007, as WO 2007/701139. The entire disclosure of each of those applications is incorporated herein by reference for all purposes.

BACKGROUND OF THE INVENTION

This invention relates to devices which are subject to waves in the water, and which in some cases utilize the power of waves in water.

As a wave travels along the surface of water, it produces vertical motion, but no net horizontal motion, of water. The amplitude of the vertical motion decreases logarithmically with depth; at a depth of about half the wave length, there is little vertical motion. The speed of currents induced by wind also decreases sharply with depth. A number of proposals have been made to utilize wave power to do useful work. Reference may be made, for example, to U.S. Pat. Nos. 986,627, 1,315,267, 2,520,804, 3,312,186, 3,453,981, 3,508,516, 3,845,733, 3,872,819, 3,928,967, 4,332,571, 4,371,347, 4,389,843, 4,598,547, 4,684,350, 4,842,560, 4,968,273, 5,084,630, 5,577,942, 6,099,368 and 6,561,856, US Publication Nos. 2003/0220027 and 2004/0102107, WO 94/10029 and WO 87/04401. The entire disclosure of each of those patents and publications is incorporated herein by reference for all purposes.

Summary of the First Preferred Aspect of the Invention

This invention relates to devices which are subject to waves in the water, including but not limited to devices which utilize the power of waves in water, for example water vehicles which travel over the surface of the water when placed in wave-bearing water (i.e. water having waves moving across its surface). Such vehicles can for example comprise (1) a float, (2) a swimmer, and (3) a tether connecting the float and the swimmer; the float, swimmer and tether being such that, when the vehicle is in still water, (i) the float is on or near the surface of the water, (ii) the swimmer is submerged below the float, and (iii) the tether is under tension; and the swimmer, when the vehicle is in wave-bearing water, interacting with the water to generate forces which tend to move the float in a direction having a horizontal component (hereinafter referred to simply as "in a horizontal direction" or "horizontally"). In the interest of brevity, this specification refers to a water vehicle comprising a float, a swimmer and a tether as described in the previous sentence as a WPV. Preferred WPVs are described in the related applications incorporated by reference.

SUMMARY OF THE INVENTION

Summary of the First Preferred Aspect of the Invention

In a first preferred aspect, this invention provides a float which will float in water and which comprises
(1) a body,
(2) an upper member which is secured to the body and extends upwards from the body, and
(3) means for controlling at least one of (a) the orientation of the upper member relative to the body and (b) the configuration of the upper member.

In a first embodiment of the float,
(a) when the float is floating in still water, the upper member has a rest orientation relative to the water and
(b) when the float is floating in wave-bearing water, said means reduces (including substantially prevents) movement of the upper member away from the rest orientation.

In a second embodiment of the float (which can, but does not necessarily, have the features of first embodiment) the upper member has a height which can be changed (for example comprises components which can telescope into each other, and/or comprises one or more components which can fold and unfold).

Summary of the Second Preferred Aspect of the Invention

In a second preferred aspect, this invention provides a cable which
(a) has a cross-section which
  (i) has a chord length which is 0.5 to 3.0 inch and
  (ii) comprises a leading edge portion and a tapered trailing edge portion, the leading edge portion including the part of the cross-section which has the greatest width, the greatest width being 0.1 to 1.0 inch and at most 0.5 times the chord length of the cross-section, and
(b) comprises
  (1) an elongate tensile member which carries load when the cable is under tension and which preferably passes through the leading edge portion of the cable, and
  (2) at least one additional elongate member which does not carry load when the cable is under tension, and
  (3) a jacket which provides the outer surface of the cable.

Summary of the Third Preferred Aspect of the Invention

In a third preferred aspect, this invention provides a WPV which comprises means for determining whether the tether is twisted.

Summary of the Fourth Preferred Aspect of the Invention

In a fourth preferred aspect, this invention provides a WPV which comprises means for untwisting the tether when the tether is twisted.

Summary of the Fifth Preferred Aspect of the Invention

In a fifth preferred aspect, this invention provides a WPV which comprises a pressure-sensitive connection which causes the tether to separate from float and/or from the swimmer, and/or causes the tether to break, when the water pressure substantially exceeds the water pressure under normal conditions of use. In this way, if the WPV becomes entangled with a whale or other sea creature, the WPV will be disentangled when the creature dives.

Summary of the Sixth Preferred Aspect of the Invention

In a seventh preferred aspect, this invention provides a WPV wherein the tether is connected to the float or to the swimmer or to both through elastic elements which can absorb snap loads created when the tether is converted from a slack state to a load-bearing state.

Summary of the Seventh Preferred Aspect of the Invention

In a seven preferred aspect, this invention provides a WPV wherein the tether is connected to the float or to the swimmer or to both through elastic elements which can absorb snap loads created when the tether is converted from a slack state to a load-bearing state.

BRIEF DESCRIPTION OF THE DRAWINGS

The invention is illustrated in the accompanying drawings, which are diagrammatic in nature and not to scale, and in which.

DETAILED DESCRIPTION OF THE INVENTION

Figure 1:
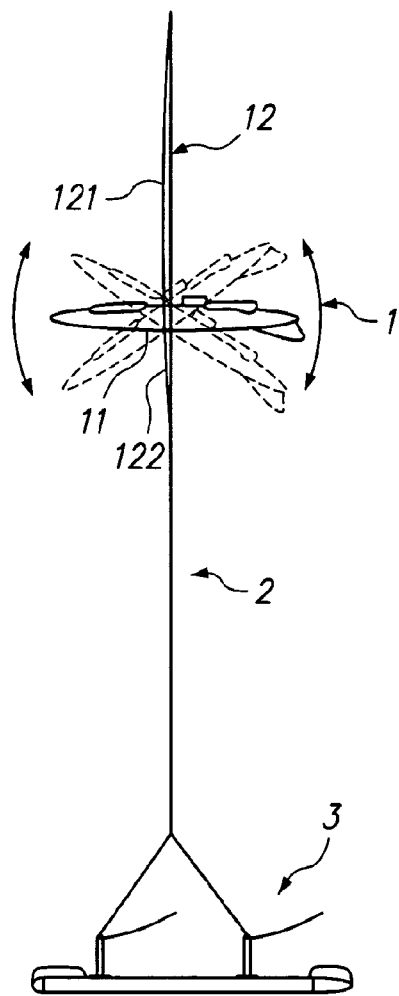
FIG. 1 is a diagrammatic illustration, not to scale, of a WPV incorporating the first preferred aspect of the invention.

In the Summary of the Invention above, the Detailed Description of the Invention, the Examples, and the claims below, and the accompanying drawings, reference is made to particular features (including for example components, ingredients, elements, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular Figure, that feature can also be used, to the extent appropriate, in the context of other particular aspects, embodiments, claims and Figures, and in the invention generally. The invention disclosed includes embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, a composition or device "comprising" (or "which comprises") components A, B and C can contain only components A, B and C, or can contain not only components A, B and C but also one or more other components. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When a range is given as "(a first number) to (a second number)" or "(a first number)-(a second number)", this means a range whose lower limit is the first number and whose upper limit is the second number. For example, "from 8 to 20 carbon atoms" or "8-20 carbon atoms" means a range whose lower limit is 8 carbon atoms, and whose upper limit is 20 carbon atoms. The terms "plural", "multiple", "plurality" and "multiplicity" are used herein to denote two or more than two features.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps (except where the context excludes that possibility). Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features (except where the context excludes that possibility). Where reference is made herein to two or more features, this includes the possibility that the two or more features are replaced by a lesser number or greater number of features providing the same function (except where the context excludes that possibility). The numbers given herein should be construed with the latitude appropriate to their context and expression; for example, each number is subject to variation which depends on the accuracy with which it can be measured by methods conventionally used by those skilled in the art.

This specification incorporates by reference all documents referred to herein and all documents filed concurrently with this specification or filed previously in connection with this application, including but not limited to such documents which are open to public inspection with this specification.

A. Detailed Description of the First Aspect of the Invention

In its first aspect, the invention provides a float which can be used for any purpose, including for example as a buoy (or part of a buoy) or as part of a WPV. The term "orientation" denotes the angular relationship between the body and the upper member. The term "configuration" denotes the dimensions (e.g. height and/or width) of the upper member, and includes the presence or absence of auxiliary members, e.g. sensors.

The float can optionally have one or more of the following characteristics:

A1. (a) When the float is floating in still water, the upper member has a rest orientation relative to the water; and
(b) when the float is floating in wave-bearing water, the controlling means reduces movement of the upper member away from the rest orientation.

A2. (a) The upper member is secured to the body so that it can be rotated relative to the body, e.g. by means of a pivot joint which allows pitch motion and/or roll motion, or by a gimbal joint such as a ball and socket (a pivot joint which allows only pitch motion may be adequate when the float is relatively long and narrow); and
(b) the controlling means comprises a lower member which (i) is secured to the body, (ii) extends downwards from the body, (iii) is linked to the upper member, and (iv) when the float is in wave-bearing water, causes rotation of the upper member relative to the body when the float is in water and is subject to wave motion.

A3 The lower member can for example have one or more of the following characteristics:—

A3a It is secured to the upper member so that, when the float pitches, the lower member reduces the movement of the upper member away from the rest orientation. Alternatively or additionally, it is secured to the upper member so that, when the float rolls, the lower member reduces the movement of the upper member away from the rest orientation; this feature is particularly appropriate when the float has two or more hulls, e.g. is a catamaran, in which case the upper member will generally be placed between the hulls.

A3b It has a weight and/or moment of inertia which is substantially greater than the weight and/or moment of inertia of the upper member. For this purpose, a weight can optionally be secured to the lower member, preferably at its lower end, either directly or through a flexible cable. When the float as part of a WPV and the tether is secured to the lower member, the desired weight can be partly or completely supplied by the weight of the tether and the swimmer.

A3c It is secured to the upper member so that the upper and lower members form a single body (a "pole"). In one embodiment, the pole passes through a hinge socket in the float body when the float is floating in water, and can be pulled up through the hinge socket for storage when the float is not floating in water or for deployment. In another embodiment, the pole can be secured to the float at two or more different levels so that the height of the upper member can be increased, e.g. to place a sensor at a desired high level (or decreased), and the length of the lower member can be correspondingly decreased (or increased, e.g. to lower the swimmer when the tether is attached to the lower member, as may be desirable when the waves are large).

A3d when the float is in still water, it lies in a vertical plane which includes the longitudinal axis of the body of the float and/or is substantially vertical, or, when the float is used as the float in a WPV, is inclined to the vertical towards the forward end, for example at an angle of up to 12°, e.g. 3-8°, e.g. about 5°, to the vertical.

A4 The upper member can optionally have one or more of the following characteristics:—

A4a It has a height or other dimension which can be changed. For example, the upper member can be telescopic (i.e. comprise two or more units which slide relative to each other and thus change a dimension of the upper member), and/or can comprise two or more units which can fold and unfold and thus change a dimension of the upper member. The float can include a motor to change a dimension of the upper member. The float can include one or more sensors which activate actuators to change a dimension of the upper member, for example sensors (which may be on the upper member) which sense the height of the waves, so that the height of the upper member can be reduced as the height of the waves increases, and vice versa. An advantage of an upper member whose height or other dimension can be changed is that its wind resistance can be minimized.

A4b It carries one or more accessories selected from the group consisting of cameras, radio antenna, radio transmitters, radio repeaters, meteorological sensors, carbon dioxide sensors, and beacons, and sensors for sensing heat and gas flux between the atmosphere and the ocean.

A4c It passes through or around the body of the float.

A4d When the float is in still water, it has an axis which lies in a vertical plane including the longitudinal axis of the float and/or is substantially vertical.

A4f It comprises one or more flexible portions so that it can bend in overload situations.

A5f It is not associated with a lower member as described above, for example is fixed to the body of the float so that its orientation does not change when the float is in wave-bearing water, or makes use of a different mechanism to control its orientation.

A6 The float has a length of 2-30 feet, e.g. 5-15 feet, and a width which is 0.1 to 0.6 times, e.g. 0.2 to 0.3 times, the length of the float.

A7 The float is the float in a WPV as hereinbefore defined. In such a WPV, the tether can be connected to the lower member, preferably to the lowest point of the lower member, or to the float body. The connection can for example be through a universal joint.

Preferred embodiments of this aspect of the invention are particularly useful in supporting sensors and other equipment at a desirable and preferably relatively constant level above the water. For example, some embodiments of this aspect of the invention reduce (including in some cases, substantially eliminate) the swaying motion of an upper member which is fixed to a float in wave-bearing water. If desired, the upper member can be maintained in a substantially vertical position. Such swaying motion distorts wind measurements and reduces the efficacy of radio communications. Many of the instruments which are conventionally mounted on data buoys and data collection water vehicles operate best at relatively high levels about the surface of the water.

The standard height for reporting wind speed is 10 m above water level, but in prior art practice wind speeds are often measured at lower levels and then corrected. When measuring wind speeds using a float according to the present invention, the measurements are preferably taken at a level at least 1.5 m above the water, and can generally be taken at substantially higher levels; if desired, the wind speeds can be corrected to take account of information provided by sensors on the float which observe the height of the waves.

For line of sight radio communications, the greater the height of the transmitter and receiver, the greater the possible range. Preferred embodiments of the present invention make it possible to create a radio communications repeater network comprising a plurality of antenna-bearing WPVs which are separated by a substantial distance, for example 10-20 miles. The number and separation of WPVs can be chosen so that there is redundancy, so that the absence of one or a small number of the WPVs does not prevent the network from operating.

Camera observations are best taken at a level above the waves and spray.

For the measurement of air/sea heat flux (which is important to climate models and meteorological models) sensors that measure temperature or carbon dioxide concentration are placed at various heights above and below the surface of the water. It has been found that carbon dioxide flux can be characterized by positioning sensors at suitable heights, e.g. about 2 m and about 4 m, above the water surface. In one embodiment of the floats of the present invention, the upper member comprises carbon dioxide sensors placed at different heights, e.g. about 2 and about 4 m, above the water surface. The float can also include a carbon dioxide sensor below the surface of the water. When the float is part of a WPV, carbon dioxide sensors can also be placed on the swimmer and/or on the tether and/or on a towed array. The towed array can be a towfish which has buoyancy controls which enable it to sweep up-and-down from the surface to a depth of 30-100 m (or even more).

The invention disclosed herein includes not only a WPV which has an upper member as disclosed above and which is fitted with carbon dioxide sensors, but also any WPV which is fitted with carbon dioxide sensors as disclosed above.

The float can include sensors (e.g. accelerometers or rate sensors such as rate-sensitive GPS) which cause equipment on the upper member to operate only when the float is at or close to a wavecrest.

Preferred embodiments of this aspect of the invention make it practical to use upper members having a height which is greater than is practical when using an upper member which is fixed to the float. For example, the upper member can optionally have a fixed height (or, if the upper member has an adjustable height, a maximum height) which is at least 0.5 times the length of the float, e.g. at least 0.8 times the length of the float, e.g. 0.8-3 times the length of the float or 1-2 times the length of float. Thus, the height can be at least 6 feet, or at least 10 feet, e.g. 6-15 feet, or even more when the height is adjustable, for example a height of 3-10 feet when fully collapsed, and a height of 10-30 feet when fully extended.

B. Detailed Description of the Second Preferred Aspect of the Invention

The cables of the second preferred aspect of the invention are useful in a wide variety of situations in which it is useful to reduce the drag on a cable when the cable moves relative to water or other liquid in which it is immersed. In one such use, the cable is used as a tether in a WPV.

The cable can optionally have one or more of the following characteristics

B1 It has a cross-section which has a chord length which is 0.8 to 1.5 inch.

B2 It has a greatest width which is at most 0.3 times the chord length of the cross-section.

B3 It has a cross-section which includes a tapered trailing edge section.

B4 It has a relatively rounded leading edge and sharp trailing edge such that the cross section is similar to a tear-drop or airfoil shape.

B5 The jacket is composed of a polymeric composition e.g. a composition which comprises an epoxy resin or a polyurethane.

B6 The jacket has been prepared by extruding or otherwise molding a polymeric composition around the tensile member(s) and the additional elongate member(s), preferably by a process which does not result in residual stresses in the jacket, for example by casting the composition around the elongate components, or which includes a step, after the jacket has been formed around the elongate components, in which any stresses in the jacket are reduced (including removed entirely).

B7 The jacket comprises additives which inhibit marine growth and other fouling.

B8 The additional elongate member comprises one or more of insulated electrical conductors, optical fibers and acoustic cables, e.g. an insulated ribbon cable.

B9 The cable carries identification, e.g. visible markings, which enable the cable to be inspected to determine whether it is twisted, for example by a camera on the float body.

B10 The cable further comprises fins extending from the insulating jacket at spaced-apart intervals; the fins can for example be 1-5 in.$^2$ in area, and the distance between adjacent fins can for example be 2-12 feet.

B11 The cable further comprises a second elongate tensile member which carries load when the cable is under tension and which passes through the leading edge portion of the cable.

B12 The elongate tensile member(s) is(are) surrounded by a tube which enables the tensile member(s) to move independently of the remainder of the cable, for example a tube composed of a polymeric composition comprising a fluorinated polymer, e.g. polytetrafluoroethylene. When there is more than one tensile member, there can be such a tube around each of the tensile members, or a single tube around all the tensile members. This expedient enables the tensile member(s) to stretch without stretching the other elongate components, e.g. electrical conductors. It also enables the remainder of the cable to rotate around the tensile member(s) and feather into a reduced drag orientation.

B13 The cable comprises a braided component which resists twisting, e.g. a braided sleeve surrounding some or all of the tensile member(s) and additional elongate member(s). The braided component can for example be composed of a high-strength polymeric material, e.g. Kevlar or another aramid polymer.

B14 The cable comprises a water-blocking component to prevent any water which penetrates the jacket from traveling along the cable.

B15 The tensile member is composed of stainless steel or a high-strength polymeric material, e.g. an aromatic polyester such as Vectran, for example in the form of multiple strands twisted together. In some cases it is desirable to stretch the tensile member under an appropriate load before it is made up into the cable, to ensure that it does not undergo substantial stretching in when it is used as a tether. The tensile member may have a diameter of, for example, 0.1 to 0.3 inch.

B16 The cable is used as the tether in a WPV, the cable being aligned so that its leading edge portion is oriented towards the front of the WPV, and being connected to the body of the float and to the swimmer so that the loads are carried by the tensile member.

B17 The cable is used as the tether in a WPV and is attached to the float and/or to the swimmer by a swivel joint that allows the tether to rotate relative to the float and/or swimmer.

C. Detailed description of the Third Preferred Aspect of the Invention

The third preferred aspect of the invention is concerned with WPVs which comprise means for determining whether the tether is twisted. It is possible to design a WPV which, under most operating conditions, will not cause the tether to become twisted. However, the tether may become twisted during deployment, or in very flat calm seas, or in very violent seas. A twisted tether creates undesirable drag. It is, therefore, desirable for the WPV to comprise means for determining whether the tether is twisted. Such WPVs can optionally have one or more of the following characteristics.

C1 The tether includes at least one identifier, e.g. markings which can be identified by suitable equipment (e.g. each side having a different color, or a stripe along one side only), and the float or the swimmer or both comprise such suitable equipment, e.g. a still or video camera mounted on the float or the swimmer, which can inspect the identifier to determine whether or not the tether is twisted, and communicate the results of the inspection, e.g. via radio to an observer.

C2 The means for determining whether the tether is twisted comprises at least two compasses which are placed at vertically spaced-apart locations on the WPV. For example, one compass can be placed on the float, another compass on the swimmer, and at least one other compass somewhere along the tether (preferably not at the midpoint of the tether). In another example, only two compasses are used, one on the swimmer and the other on the float, and the compasses are monitored on an ongoing basis to keep track of the total amount of rotation relative to the Earth's magnetic field. Each compass reports a rotation to a controller, and the controller compares the two to determine if twisting has occurred. This system has the benefit of using only two compasses and placing them in locations where electronics may already be present.

C3 The float and the swimmer include equipment which detects and reports relative rotation of the float and the swimmer.

C4 The WPV can deliberately induce one or more twists, see how the speed is affected, and then continue with the number of twists which optimizes the speed, which can be assumed to be when the tether is not twisted. If the WPV includes wave characterization sensors, wind sensors, and water speed sensors so that it can determine the expected speed under the observed conditions, this procedure can be followed when the speed is less than the expected speed.

D. Detailed description of the Fourth Preferred Aspect of the Invention

The fourth preferred aspect of the invention is concerned with WPVs which comprise means for untwisting the tether when the tether has become twisted. Such WPVs can optionally have one or more of the following characteristics.

D1 The means for untwisting the tether comprises a motor-driven thruster on the float which can spin the float around and untwist the tether.

D2 The means for untwisting the tether comprises a retractable fin at the front of the float. The fin is normally retracted but can be deployed to create drag at the front of the float; this causes the float to rotate through 180°; the fin is then retracted, and a fin at the rear of the float causes the float to continue rotating through a further 180°.

D3 The means for untwisting the tether comprises a motor-driven rotation coupling at the junction of the tether and the float, or at the junction of the tether and the swimmer, or at an intermediate point of the tether. If the tether includes electrical wires, the rotation coupling preferably includes a break in the wires, for example as may be achieved by a sliding contact slip ring or a by device that does not maintain electrical contact throughout the rotation but does so at one point of each revolution. The motor driven rotation coupling may comprise a geared electric motor that is either in line or proximal to the rotation joint and is capable of rotating the cable relative to the float or swimmer. When the motor is not driven it may include a brake or other means to prevent the rotation joint from moving, in order to reduce wear on sliding electrical contacts.

E. Detailed description of the Fifth Preferred Aspect of the Invention

The fifth preferred aspect of the invention is concerned with WPVs which comprise a pressure-sensitive connection which is triggered by excessive water pressure. Such WPVs can optionally have one or more of the following characteristics.

E1 The pressure sensitive connection comprises a piston with a radial seal inside a cylinder and encloses an air chamber. Air pressure inside the chamber and a coil spring urge the piston to extend. In the extended position the piston prevents a latch or other mechanical element from allowing the cable to release. Water pressure urges the piston to retract. In the retracted position, the piston allows the latch or other mechanical element to release.

E2 The pressure-sensitive connection is at the junction of the float and the tether.

E3 The pressure-sensitive connection comprises an eye in the tensile member of the tether, a pin which passes through the eye and which is withdrawn from the eye by the release of a spring.

E4 The pressure-sensitive connection is triggered when it is at a depth of 30 feet or more, for example at a depth of 50 feet or more, or at a selected depth which is between 30 feet and 90 feet.

E. Detailed description of the Sixth Preferred Aspect of the Invention

The sixth preferred aspect of the invention is concerned with WPVs in which the tether is secured to the float and/or to the swimmer through a two-axis universal joint which pivots when the float/swimmer pitches or rolls but does not pivot when the float/swimmer yaws. This guides the tether to remain aligned with the float and thus reduces the tendency of the tether to twist. The universal joints may comprise two hinges at right angles to each other, with the tensile loads from the tether being transmitted through the hinges to the float or swimmer. Any electrical components of the tether are routed around or through the universal joint so that they do not see tensile loads and bend in a controlled manner consistent with their bending ability and fatigue strength.

F. Detailed description of the Seventh Preferred Aspect of the Invention

The seventh preferred aspect of the invention is concerned with WPVs in which the tether is connected to the float, or to the swimmer, or to both, through elastic elements which can absorb snap loads created when the tether is converted from a slack state to a load-bearing state.

Referring now to the drawings, FIG. 1 shows a WPV incorporating the first aspect of the invention. The WPV is made up of a float 1, a tether 2 and a swimmer 3. The float comprises a body 11 and a pole 12 which passes through the body 11 and is secured to it by a pivot joint. The pole 12 thus provides an upper member 121 and a lower member 122. Phantom lines show the outline of the float as it pitches as a result of wave motion. The pole 12, however, does not follow the pitching of the float. The swimmer is shown directly below the float, with the tether vertical. In practice, the swimmer will tend to be forward of the float, and if it is desired to keep the upper member vertical, the bottom member may angle forward from the upper member by an appropriate angle, for example about 5°.

Figure 2:
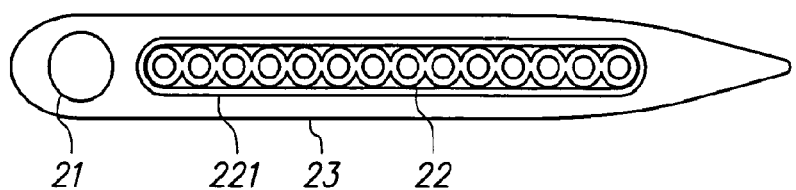
FIGS. 2 and 3 are cross-sections through cables according to the second preferred aspect of the invention.

FIG. 2 is a cross-section through a cable according to the second preferred aspect of the invention. The cross section is to scale, and the chord length of the cross-section can for example be 0.8 to 1.5 inch. The cable comprises a tensile member 21, a ribbon cable 22 which is surrounded by a braided polymeric sleeve 221, and a streamlined polymeric jacket 23. The tensile member 21 can for example be a 0.09375 inch diameter 316 stainless steel wire rope, 7×7 construction. The ribbon cable 22 can for example comprise a plurality, e.g. 14, 22 AWG tinned copper wires each surrounded by fluorinated ethylene propylene (FEP) installation. The braided sleeve 221 can for example be composed of Kevlar strands. The polymeric jacket 21 can for example be composed of a marine grade polyurethane having a Shore A 80 Durometer.

Figure 3:
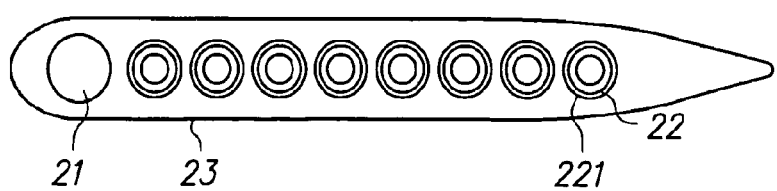

FIG. 3 is a cross-section through another cable according to the second preferred aspect of the invention. The cross section is to scale, and the chord length of the cross-section can for example be 0.8 to 1.5 inch. The cable comprises a tensile member 21, a plurality, e.g. 8, of conductors 22, each surrounded by a braided stainless steel sleeve, and a streamlined polymeric jacket 23. The tensile member 21 and jacket 23 can for example be as described for FIG. 2. Each of the conductors can for example be a 20 AWG tinned copper wire.

Figure 4:
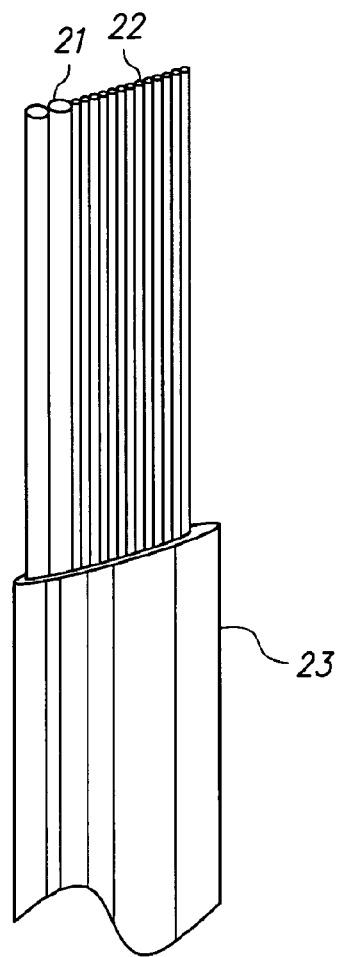
FIGS. 4 and 5 are perspective views of cables according to the second preferred aspect of the invention.

FIG. 4 is a perspective view of another cable according to the second preferred aspect of the invention. The cable comprises two tensile members 21, a ribbon cable 22, and a polymeric jacket 23. Particularly when the tensile member is liable to stretch significantly under load, for example when it is a synthetic fiber rope, e.g. composed of Vectran, preferably each of the tensile members is surrounded by a tube of a suitable polymeric material, e.g. polytetrafluoroethylene, so that it can stretch and rotate independently of the remainder of the cable.

Figure 5:
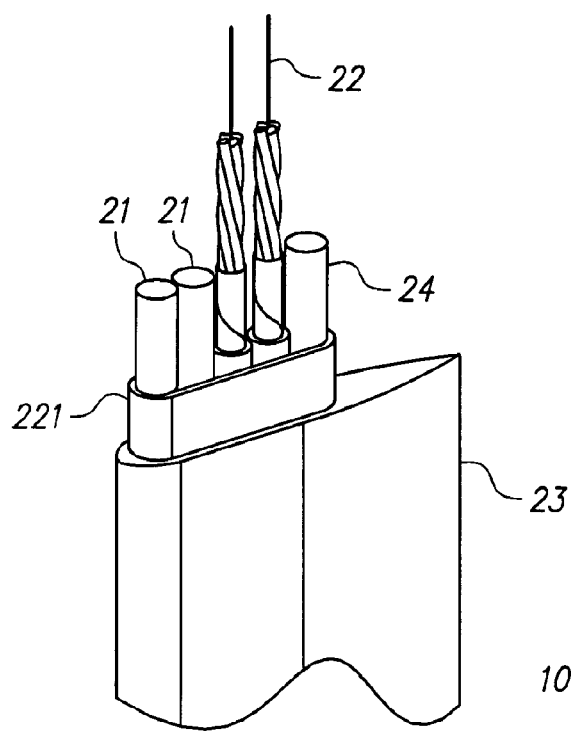

FIG. 5 is a perspective view of another cable according to the second preferred aspect of the invention. The cable comprises two tensile members 21, two cables 22, each containing multiple individually insulated electrical conductors, a trailing edge member 24, a braided sleeve 221 which surrounds components 21, 22 and 24, and a polymeric jacket 23. The tensile members 21 can for example be as described above. Each of the cables 22 can for example comprise four individually insulated copper alloy conductors spiraled around a synthetic fiber rope, all surrounded by a further layer of insulation and/or a braided wire shield, e.g. of copper or stainless steel. The braided sleeve 221 can for example be composed of a metal or polymeric composition, e.g. Kevlar or nylon. The trailing edge member 24 can for example a metal or synthetic fiber rope; it does not carry load, but helps to maintain the structural integrity of the cable during handling and use.

Figure 6:
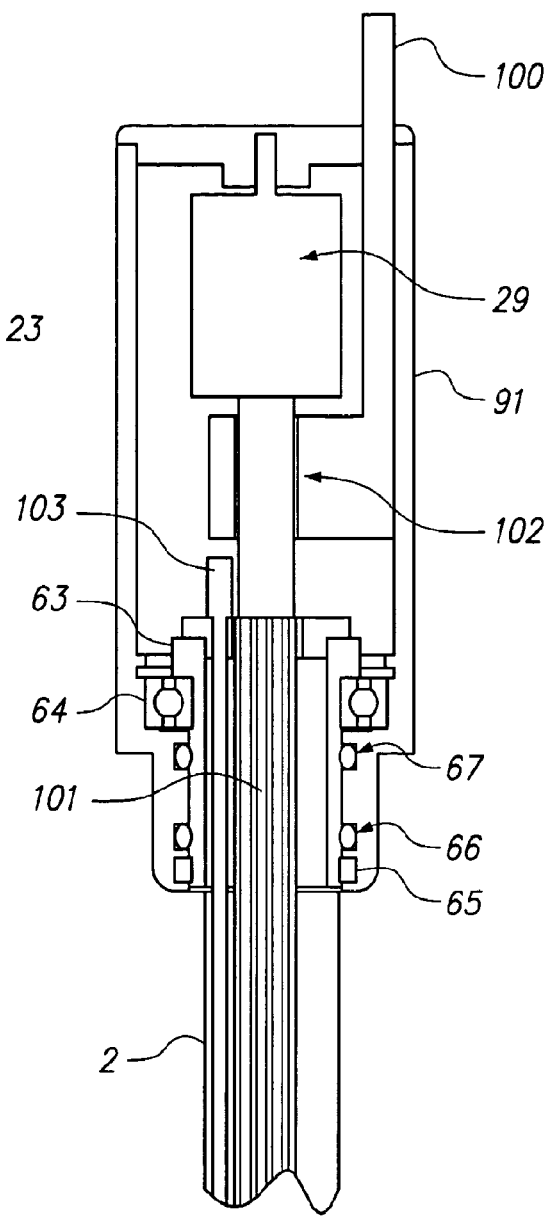
FIGS. 6 and 7 are cross-sectional and perspective views of a rotation coupling for use in the fourth preferred aspect of the invention.
Figure 7:
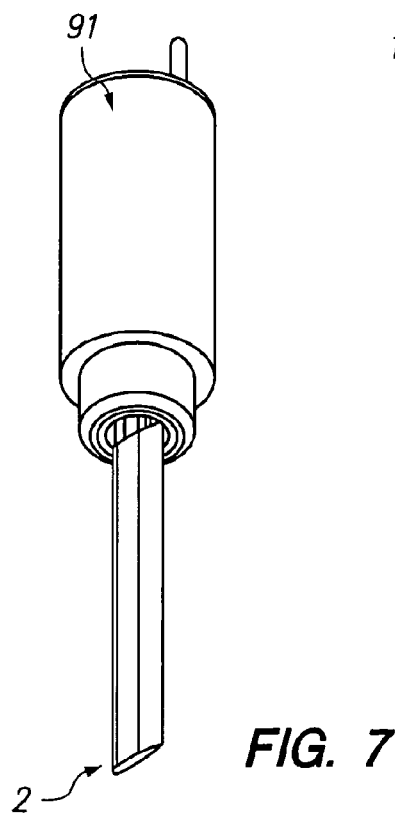

FIG. 6 is a cross-sectional view, and FIG. 7 is a perspective view of a driven rotation coupling which can be used in the fourth preferred aspect of the invention. The Figures show a tether 2 which is terminated in a driven rotation coupling. The electrical conductors in the tether are connected to exiting electrical wires 100 through solder joints in electrical connection area 101 which is filled with potting compound (not shown) and a sliding contact slip ring 102. The tensile member in the tether is terminated at location 103. The coupling comprises a housing 91 and a gear motor 29 whose output is fixed to the housing 91 and whose body is fixed to a center post. The coupling comprises an output hollow shaft 63, a load carrying bearing 64, a plastic bushing and primary wiper 65, a primary seal 66 and a secondary seal 67.

Figure 8:
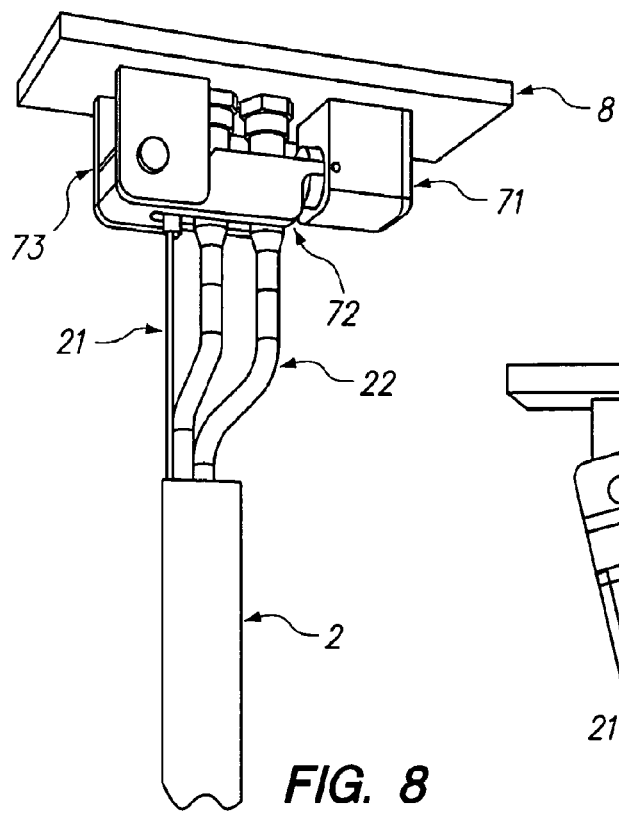
FIG. 8 is a perspective view of a cable release mechanism for use in the fifth preferred aspect of the invention.
Figure 10:
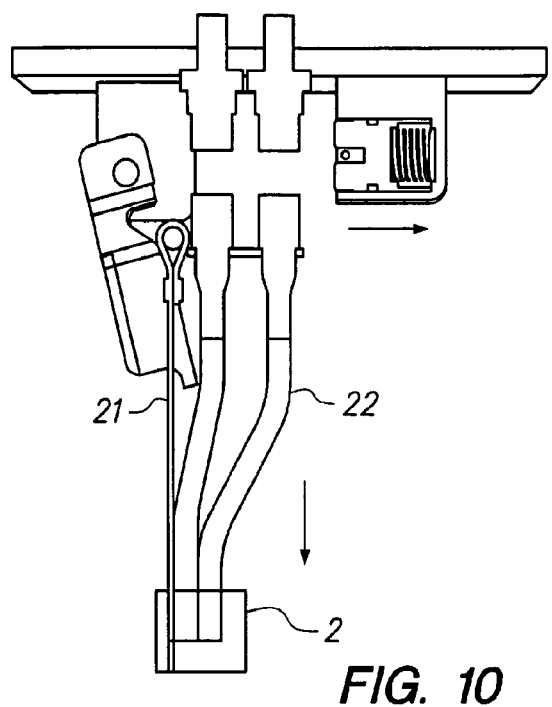
FIGS. 9 and 10 are cross-sectional views of the mechanism of FIG. 8 in the closed and open positions.
Figure 9:
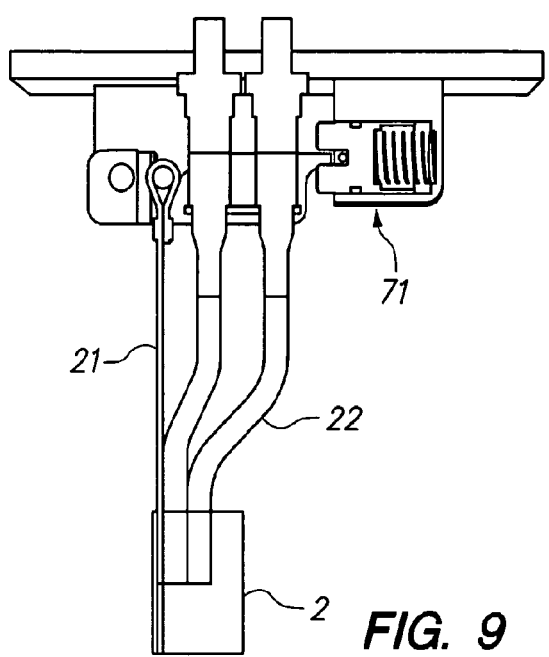

FIGS. 8-10 illustrates a pressure-sensitive connection for use in the fifth preferred aspect of the invention. The pressure-sensitive connection 7 is mounted on a baseplate 8 which is secured to the float. The connection comprises a pressure activated cylinder 71, a latch bar 72 and a hinge pin 73. The tensile member 21 of the tether is terminated with an eye and a pin. The latch bar 72 supports both the eye and the pin, and allows both to pull free when the pressure piston collapses the air chamber.

The invention claimed is:

1. A wave-powered vehicle which comprises
    (1) a float,
    (2) a swimmer, and
    (3) a tether connecting the float and swimmer;
the float, swimmer and tether being such that, when the vehicle is in still water, (i) the float is on or near the surface of the water, (ii) the swimmer is submerged below the float, and (iii) the tether is under tension; and the swimmer, when the vehicle is in wave-bearing water, interacting with the water to generate forces which tend to move the float in a direction having a horizontal component;
the tether being secured to the float through a two-axis universal joint which pivots when the float pitches or rolls but does not pivot when the float yaws, and the tether being a cable which
    (a) has a cross-section which
        (i) has a chord length which is 0.5 to 3.0 inch and
        (ii) comprises a leading edge portion and a trailing edge portion, the leading edge portion including the greatest width of the cross-section, the greatest width being 0.1 to 1.0 inch and at most 0.5 times the chord length of the cross-section, and
    (b) comprises
        (1) an elongate tensile member which carries load when the cable is under tension, and
        (2) at least one additional elongate member which does not carry load when the cable is under tension, and
        (3) a jacket which provides the outer surface of the cable;
        the cable being aligned so that its leading edge portion is directed towards the front of the wave-powered vehicle.

2. A wave-powered vehicle according to claim 1 wherein the tensile member is part of the leading edge portion; the cross-section has a chord length which is 0.8 to 1.5 inch and a greatest width which is at most 0.5 times the chord length; and the trailing edge section is tapered.

3. A wave-powered vehicle according to claim 1 wherein the tether is secured to the swimmer through a two-axis universal joint which pivots when the swimmer pitches or rolls but does not pivot when the swimmer yaws.

4. A wave-powered vehicle according to claim 1 wherein the tether has a first side having a first color and a second side having a second color which is different from the first color.

5. A wave-powered vehicle according to claim 1 which comprises a motor driven rotation coupling for untwisting the tether when the tether is twisted.

6. A wave-powered vehicle according to claim 1 which comprises a pressure-sensitive connection which causes the tether to separate from the float or from the swimmer or which causes the tether to break when water pressure on the connection substantially exceeds the water pressure on the connection under normal conditions of use.

7. A wave-powered vehicle according to claim 1 wherein the tether has a first side having a stripe thereon and a second side not having a stripe thereon.

8. A wave-powered vehicle which, when placed in wave-bearing water, travels over the surface of the water, and which comprises
(1) a float,
(2) a swimmer, and
(3) a tether connecting the float and swimmer;
the float, swimmer and tether being such that, when the vehicle is in still water, (i) the float is on or near the surface of the water, (ii) the swimmer is submerged below the float, and (iii) the tether is under tension; and the swimmer, when the vehicle is in wave-bearing water, interacting with the water to generate forces which tend to move the float in a direction having a horizontal component;
the float comprising
(1) a body,
(2) an upper member which
  (i) is rotationally secured to the body by (a) a pivot joint which allows pitch motion and/or roll motion, or (b) a gimbal joint,
  (ii) extends upwards from the body, and
  (iii) when the wave-powered vehicle is in still water, has a rest orientation relative to the still water, and
(3) a lower member which (i) is secured to the body, (ii) extends downwards from the body, (iii) is linked to the upper member, and (iv) when the wave-powered vehicle is in wave-bearing water reduces movement of the upper member away from the rest orientation.

9. A wave-powered vehicle according to claim 8 wherein the upper member has a height which can be changed.

10. A wave-powered vehicle-according to claim 9 wherein the upper member comprises two or more units which are slidable relative to each other to change the height of the upper member.

11. A wave-powered vehicle according to claim 8 wherein the upper member is secured to the body by a pivot joint which allows pitch motion and roll motion.

12. A wave-powered vehicle according to claim 8 wherein the lower member has a weight which is substantially greater than the weight of the upper member.

13. A wave-powered vehicle according to claim 8 wherein the lower member has a moment of inertia which is substantially greater than the moment of inertia of the upper member.

14. A wave-powered vehicle according to claim 8 wherein the upper and lower members are secured together as a single body.

15. A wave-powered vehicle according to claim 14 wherein the single body comprising the upper and lower members can be secured to the float at two or more different heights on the float so that the upper member has a height which can be increased or decreased and the lower member has a length which can be correspondingly decreased or increased.

16. A wave-powered vehicle according to claim 8 wherein the upper member comprises carbon dioxide sensors which are placed on the upper member at different heights above the water level.

17. A wave-powered vehicle according to claim 9 wherein the upper member can fold and unfold, and the height of the upper member can be changed by folding and unfolding the upper member.

* * * * *